United States Patent
Tsai

(10) Patent No.: US 7,991,203 B2
(45) Date of Patent: Aug. 2, 2011

(54) VIDEO COMMUNICATION DEVICE AND IMAGE PROCESSING SYSTEM AND METHOD OF THE SAME

(75) Inventor: Chao-Lien Tsai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 649 days.

(21) Appl. No.: 12/108,046

(22) Filed: Apr. 23, 2008

(65) Prior Publication Data

US 2009/0097754 A1   Apr. 16, 2009

(30) Foreign Application Priority Data

Oct. 11, 2007 (CN) .......................... 2007 1 0202026

(51) Int. Cl.
*G06K 9/00* (2006.01)
(52) U.S. Cl. ......... 382/118; 382/107; 349/114; 349/106
(58) Field of Classification Search .................. 382/107, 382/164, 276; 349/114, 106.98; 348/222.1, 348/333.01, 239
See application file for complete search history.

(56) References Cited

U.S. PATENT DOCUMENTS

| 6,072,496 A * | 6/2000 | Guenter et al. | 345/419 |
|---|---|---|---|
| 7,224,851 B2 * | 5/2007 | Kinjo | 382/276 |
| 7,295,240 B2 * | 11/2007 | Kobayashi et al. | 348/333.06 |
| 7,593,547 B2 * | 9/2009 | Mittal et al. | 382/103 |
| 7,706,576 B1 * | 4/2010 | Beck et al. | 382/118 |
| 7,801,332 B2 * | 9/2010 | Albertson et al. | 382/107 |
| 7,840,031 B2 * | 11/2010 | Albertson et al. | 382/103 |
| 2002/0018070 A1 * | 2/2002 | Lanier | 345/629 |
| 2004/0001220 A1 | 1/2004 | Gorday et al. | |
| 2005/0047655 A1 | 3/2005 | Luo et al. | |
| 2005/0140803 A1 * | 6/2005 | Ohtsuka et al. | 348/239 |
| 2007/0110321 A1 * | 5/2007 | Okada et al. | 382/209 |
| 2007/0183663 A1 * | 8/2007 | Wang et al. | 382/173 |
| 2008/0024643 A1 * | 1/2008 | Kato | 348/333.01 |

FOREIGN PATENT DOCUMENTS

| CN | 1492379 A | 4/2004 |
|---|---|---|
| CN | 1972274 A | 5/2007 |

* cited by examiner

*Primary Examiner* — Wesley Tucker
*Assistant Examiner* — Aklilu k Woldemariam
(74) *Attorney, Agent, or Firm* — Andrew C. Cheng

(57) ABSTRACT

A video communication device includes an image capturing module for capturing a video image, and an image processing system. The image processing system includes a face detection module, and a processing module. The face detection module detects a face region and a head region corresponding to the face region in the video image. The processing module generates a processed video image by masking all areas of the video image except the head region, and outputs the processed video image.

13 Claims, 4 Drawing Sheets

VIDEO COMMUNICATION DEVICE AND IMAGE PROCESSING SYSTEM AND METHOD OF THE SAME

TECHNICAL FIELD

The present invention relates to video communication devices and, particularly, to a video communication device with an image processing system and a method for masking a setting in which a person is viewed.

DESCRIPTION OF RELATED ART

With rapid development of communications technology, video communication is increasingly becoming a feasible communications medium for broad adoption. Various video communication devices, such as videophones, are now widely used.

In video communication, a first camera of a video communication device may be employed by a first user and a second camera of another video communication device employed by a second user for sending video signals through a network for each other to see. The first user may see images of the second user through the video communication device and may also see an environment or setting from which the second user is communicating, such as a view of an interior of a room the second user is in. However, sometimes the first user or the second user may not want to transmit more than a simple image of their person. In other words, the first user or second user may not want to transmit imagery of the environment they are communicating from.

SUMMARY

In accordance with one embodiment, a video communication device includes an image capturing module for capturing a video image, and an image processing system. The image processing system includes a face detection module, and a processing module. The face detection module detects a face region, and a head region corresponding to the face region, in the video image. The processing module generates a processed video image by masking all areas of the video image except the head region, and outputs the processed video image.

BRIEF DESCRIPTION OF THE DRAWING

Many aspects of the present video communication device and image processing system and method of the same can be better understood with reference to the following drawings. The components in the drawing are not necessarily drawn to scale, the emphasis instead being placed upon clearly illustrating the principles of the video communication device, image processing system, and method of the same. Moreover, in the drawings, like reference numerals designate corresponding parts throughout the several views.

DETAILED DESCRIPTION OF THE EMBODIMENTS

Embodiments will now be described in detail below, with reference to the drawings.

Figure 1:
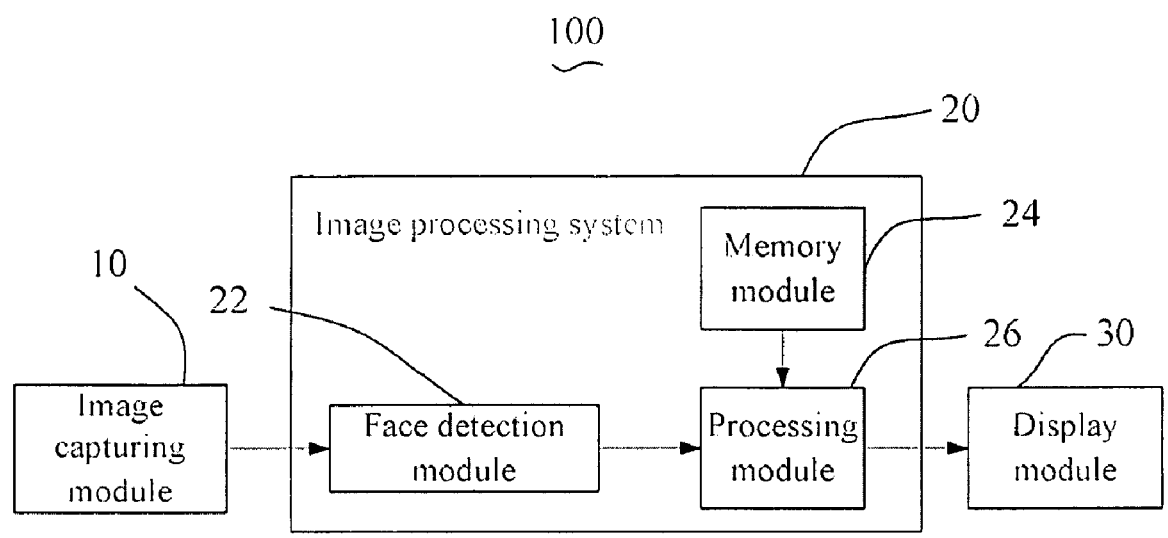
FIG. 1 is a function block diagram of a video communication device according to a preferred embodiment.

Referring to FIG. 1, a video communication device 100 according to a preferred embodiment may include an image capturing module 10, an image processing system 20, and a display module 30. The image capturing module 10, the image processing system 20, and the display module 30 may be electrically coupled in series in that order. The video communication device 100 may be a videophone.

The image capturing module 10 may capture video images at demanded intervals. For example, the image capturing module 10 may capture 25 images per second. The image capturing module 10 typically includes a capture lens (not shown) and an image sensor (not shown) disposed behind the capture lens for converting an optical image signal into an electrical image signal.

The image processing system 20 may mask areas, or portions, of the video images captured by the image capturing module 10 to generate processed video images. The display module 30 may display the video images processed by the image processing system 20, so that a user of the video communication device 100 may preview the video images processed by the image processing system 20.

The image processing system 20 may include a face detection module 22, a memory module 24, and a processing module 26.

The face detection module 21 may obtain video images from the image capturing module 10 and determining whether a person's face is present in the video images by using features, properties, parameters or values of the person's face. If the person's face is present in the video image, a face region within the video image, and a head region corresponding to the face region, can be identified by the face detection module 21.

The memory module 24 may store preset images. Format and size of the preset images may be similar to those of the video images captured by the image capturing module 10. The preset images may be landscape photos, abstract color photos, cartoon photos, and the like.

The processing module 26 may mask a portion of the video image that does not include the head region, then output the processed image. In order to mask the portion not including the head region, the video image may be processed to generate a processed image by deleting image information of the portion of the video image that does not include the head region, and setting values of pixels of the portion of the video image deleted to preset pixel values, replacing the image information deleted with that of the preset image stored in the memory module 24. The processed video image may also be formed by generating a new image by extracting the portion of the video image corresponding to the head region. Furthermore, the processing module 26 may output the processed video image to the displaying module 30 of the video communication device 100 or output the processed video image to an another video communication device communicating with the video communication device 100.

Figure 2:
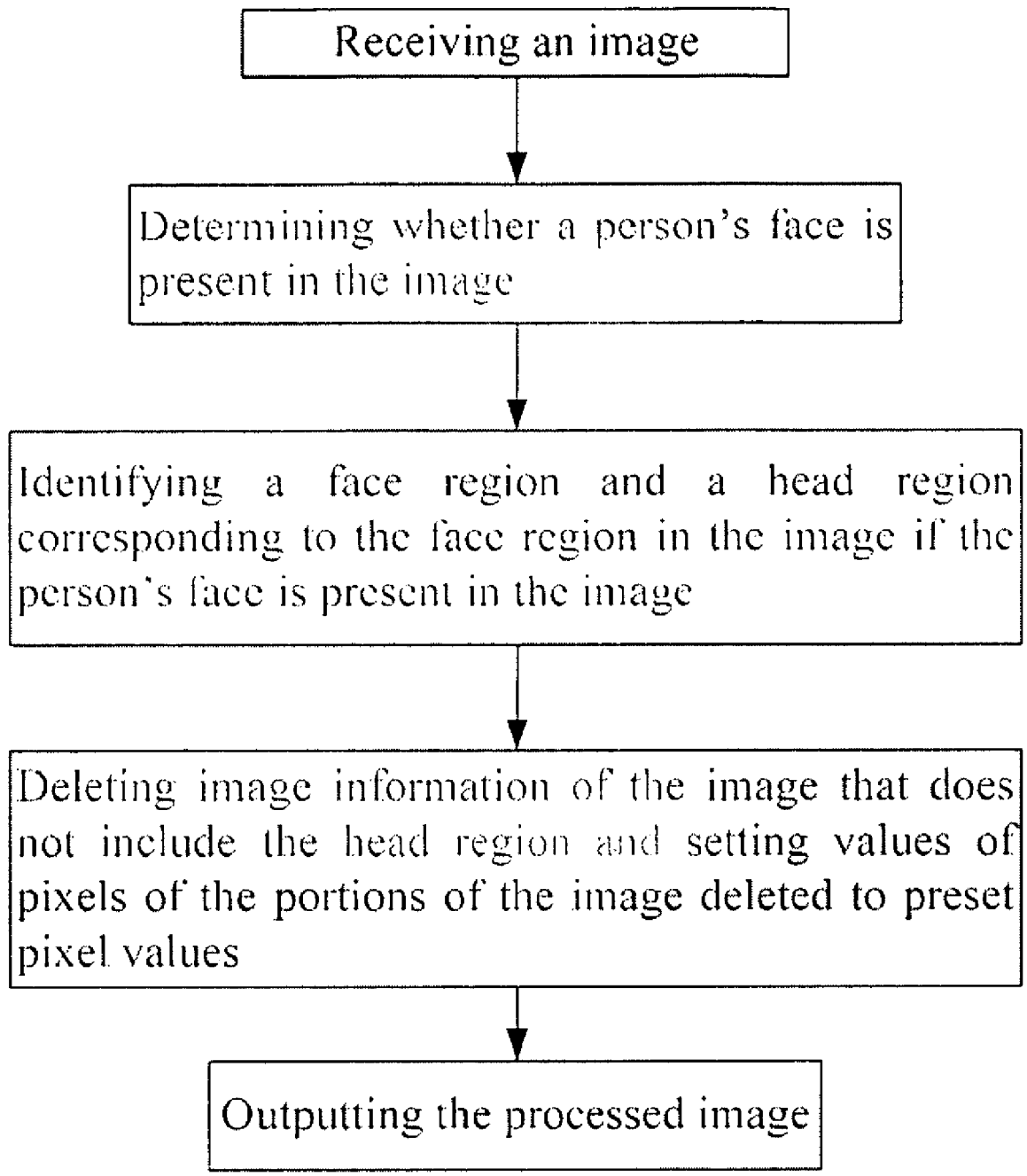
FIG. 2 is a flowchart of an image processing method according to a first embodiment.

Referring to FIG. 2, an image processing method for the video communication device 100 according to a first embodiment is also provided. The method includes steps of: receiving an image; determining whether a person's face is present in the image; identifying a face region and a head region corresponding to the face region in the image if the person's face is present in the image; deleting image information of the image that does not include the head region and setting values of pixels of the portions of the image deleted to preset pixel values; and outputting the processed image.

The image processing method according to the first embodiment may also include outputting a preset image if no person's face is present in the image.

Figure 3:
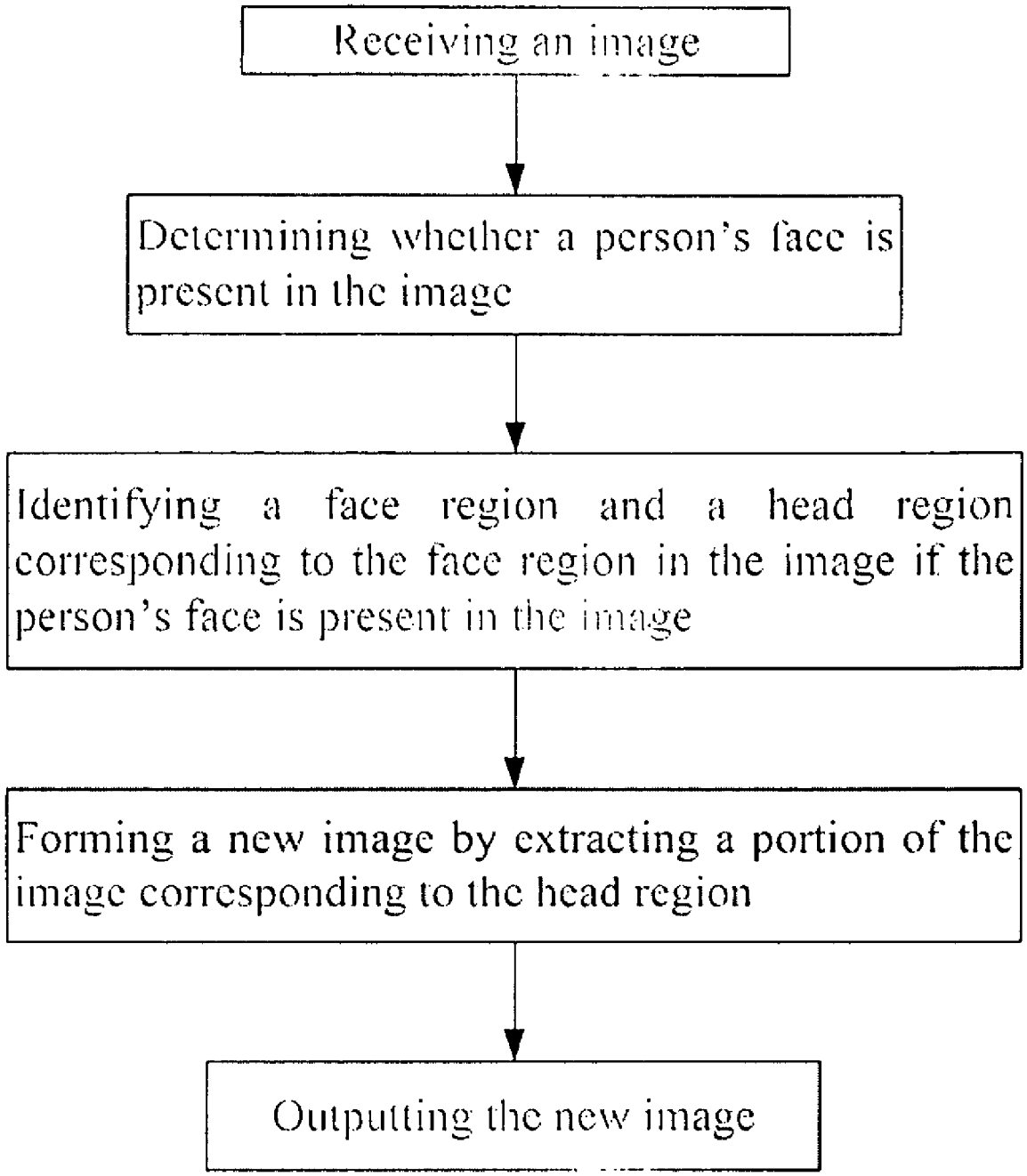
FIG. 3 is a flowchart of an image processing method according to a second embodiment.

Referring to FIG. 3, an image processing method of the video communication device 100 according to a second embodiment is provided. The method includes steps of: receiving an image; determining whether a person's face is present in the image; identifying a face region and a head region corresponding to the face region in the image if the person's face is present in the image; forming a new image by extracting a portion of the image corresponding to the head region; and outputting the new image.

The image processing method according to the second embodiment may also include outputting a preset image if no person's face is present in the image.

Figure 4:
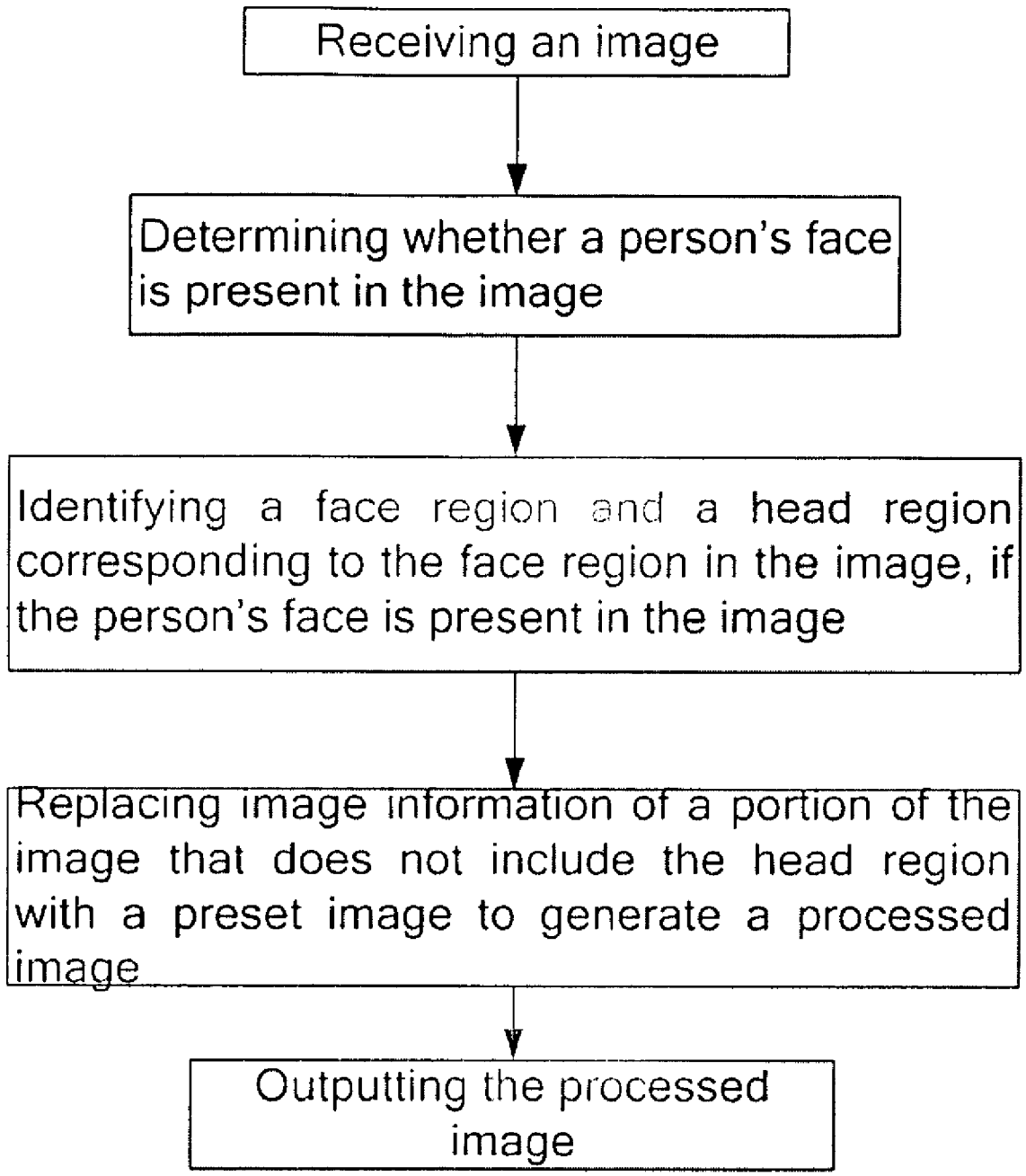
FIG. 4 is a flowchart of an image processing method according to a third embodiment.

Referring to FIG. 4, an image processing method of the video communication device 100 according to a third embodiment is also provided. The method includes steps of: receiving an image; determining whether a person's face is present in the image; identifying a face region and a head region corresponding to the face region in the image, if the person's face is present in the image; replacing image information of a portion of the image that does not include the head region with a preset image to generate a processed image; and outputting the processed image.

The image processing method according to the third embodiment may also include a step of: outputting a preset image, if no person's face is present in the image.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A video communication device comprising:
    an image capturing module comprising a capture lens and an image sensor, and capturing a video image; and
    an image processing system processing the video image, the image processing system comprising:
    a memory module storing a preset image;
    a face detection module detecting whether a face region and a head region corresponding to the face region is present in the video image; and
    a processing module, wherein when the face region is present in the video image, the processing module generates a processed video image by masking all areas of the video image except the head region, and outputs the processed video image; when no face region is present in the video image, the processing module outputs the preset image.

2. The device of claim 1, further comprising a display module displaying the video image processed by the image processing system.

3. The device of claim 1, wherein the processing module processes the video image by replacing image information of a portion of the video image not including the head region with the preset image.

4. The device of claim 1, wherein the processing module processes the video image by forming a new image by extracting a portion of the video image corresponding to the head region.

5. The device of claim 1, wherein the processing module processes the video image by deleting image information of the video image not including the head region and setting values of pixels of the image information of the image deleted to preset pixel values.

6. A nontransitory computer-readable medium comprising instructions that cause an image processing system comprising:
    a memory module storing a preset image;
    a face detection module detecting whether a face region and a head region corresponding to the face region is present in an image; and
    a processing module, wherein when the face region is present in the image, the processing module generates a processed image by masking all areas of the image except the head region, and outputs the processed image; when no face region is present in the video image, the processing module outputs the preset image.

7. The computer-readable medium of claim 6, wherein the processing module processes the image by replacing image information of a portion of the image not including the head region with the preset image.

8. The computer-readable medium of claim 6, wherein the processing module processes the image by forming a new image by extracting a portion of the image corresponding to the head region.

9. The computer-readable medium of claim 6, wherein the processing module processes the image by deleting image information of a portion of the image not including the head region and setting values of pixels of the portion of the image deleted to preset pixel values.

10. A method of processing an image for a video communication device, the method comprising:
    capturing the image by a capturing device;
    receiving the image;
    determining whether a face is present in the image;
    outputting a preset image if no face is present in the image;
    identifying a face region and a head region corresponding to the face region in the image if the face is present in the image;
    masking all areas of the image except the head region if the face is present in the image;
    generating a processed image if the face is present in the image;
    outputting the processed image; and
    outputting a preset image if no face is present in the image.

11. The method of claim 10, wherein masking the image is deleting image information of a portion of the image not including the head region and setting values of pixels of the portion of the image deleted to preset pixel values.

12. The method of claim 10, wherein masking the image is replacing image information of a portion of the image not including the head region with a preset image.

13. The method of claim 10, wherein masking the image is forming a new image by extracting a portion of the image corresponding to the head region.

* * * * *